Dec. 28, 1948.  H. G. BROOKS  2,457,639
MOUNTING FOR REAR VISION MIRRORS
Filed March 13, 1945

INVENTOR.
HARRY G. BROOKS.
BY
ATTY.

UNITED STATES PATENT OFFICE 2,457,639

MOUNTING FOR REAR-VISION MIRRORS

Harry G. Brooks, Byhalia, Miss.

Application March 13, 1945, Serial No. 582,463

1 Claim. (Cl. 88—98)

This invention relates to a mounting for rear vision mirrors or the like which provides attachment of the mirror to a portion of the automobile or truck forwardly of the driver in such manner that the mirror angle may readily be adjusted to obtain a proper view of the road behind and the adjustment thus made be retained until necessity for other positioning arises.

The invention is particularly applicable to that form of mirror support which employs an arm projecting laterally from one side of the automobile or truck, and is illustrated in connection with such an arm.

In rear vision mirror supports it is common at the present time to secure the mirror to the top bar of the windshield or to such an arm with a universally adjustable connection, most often a ball and socket joint, through which any desired angular adjustment of the mirror can be made, but difficulty has been had in effecting the connection in such manner that adjustment when made will be maintained, the joints, if loose enough to permit ready adjustment, being ordinarily too loose to hold the adjustment, and whether this be true or not, loosening due to vibration during operation of the vehicle being extremely difficult to combat.

The objects of the present invention are:

To provide a mounting which allows universal angular adjustment of the mirror relatively to the vehicle part to which it is attached which will allow ready adjustment and yet will maintain the mirror in such adjusted position.

A further object is to provide such a mounting which can be produced at low cost and may be readily used in connection with standard vehicle construction.

A further object is to provide a mirror mounting which will shield and protect the joint between the parts and, where the mirror is exposed to rain because of its mounting on an extended arm, will effectually shield the moving parts against rain and substantially prevent moisture reaching the back of the mirror and causing destruction of the reflecting backing.

A further object is to provide a mirror mounting through which the angularity of the mirror can be quickly, and easily changed to meet the requirements of different height drivers without having to loosen or tighten screws, nuts, or other parts, and which by virtue of the shift of the mirror relatively to the rubber cup will effectually hold the mirror in adjusted position.

The means by which the foregoing and other objects are accomplished, and the manner of their accomplishment, will readily be understood from the following specification upon reference to the accompanying drawings, in which.

Figure 1:
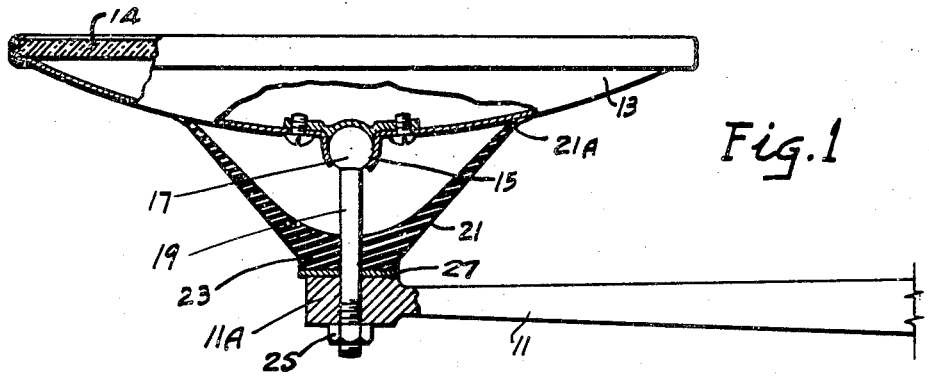
Fig. 1 is a plan view of the mirror and a portion of the arm to which it is attached with the adjustable attaching portions of the device shown in section.
Figure 2:
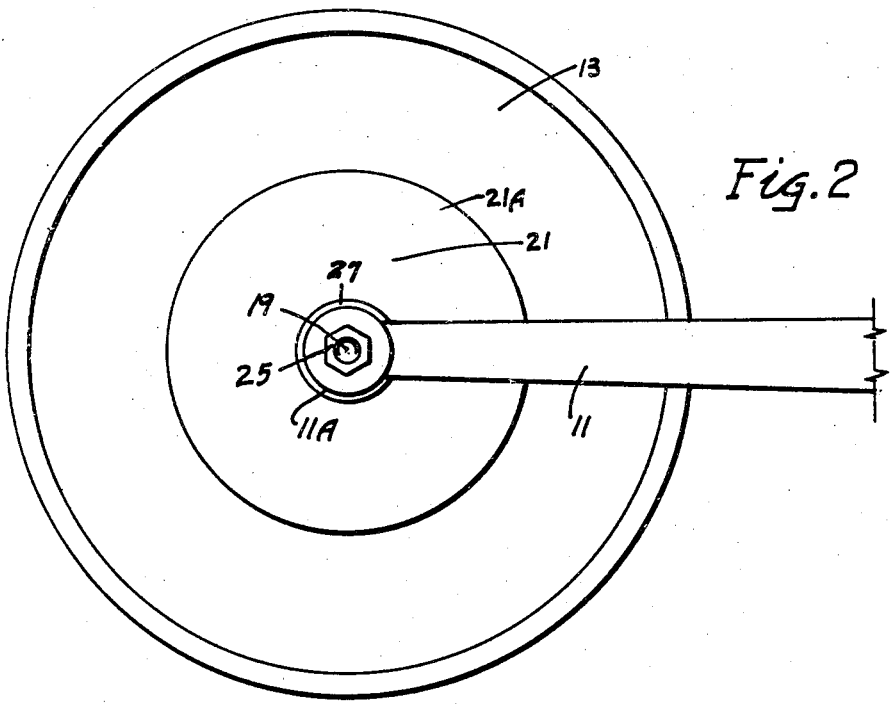
Fig. 2 is a rear view of the same mirror and attaching means.

Referring now to the drawings in which the various parts are indicated by numerals:

11 is an arm of usual type which extends laterally beyond the side of the vehicle. 13 is a housing in which the mirror 14 is mounted in usual manner. 15 is a socket forming part of the mirror housing, and 17 a ball forming one end of an attaching bolt or post 19, the ball being confined for limited universal movement in the socket 15 and the opposite end of the post extending through and closely fitting a hole in the end 11A of the arm so that it extends rigidly from such arm.

Interposed between the mirror housing 13 and the arm 11 is a hollow rubber cup 21 which is apertured at the center of its base 23 for the bolt 19. The bolt extends through and preferably tightly fits the hole in the cup and through the hole in the end 11A of the arm and is secured by a nut 25 which clamps the cup 21 firmly against the back of the housing. A washer 27 may be interposed between the arm end 11A and the base of the cup. Preferably the wall of the cup 21 is thickest at the base 23 and thins toward the rim 21A which lies against the back of the housing, and forms a suction cup which tends to adhere to the back of the housing. The rim may have a feather edge to promote seating.

Preferably the back of the housing is a spherical segment, but the cup will seat and be shiftable along a flat back or an eliptically segmental back.

In use, the mirror 14 faces backward in usual manner, and is adjusted to such angle as may be necessary by a twisting and shifting movement of the mirror housing which moves the back of the housing relatively to the rim of the cup, the cup, after such shift, securely gripping the housing and holding it against displacement during subsequent use of the vehicle, and the resilience of the cup absorbing vibration during such use.

Tension of the cup against the back of the housing is adjusted by loosening or tightening the nut 25 along the bolt or post 19.

It will also be noted that the cup seats so firmly against the back of the housing as to be rainproof and the cup forms a weatherproof cover for the ball and socket joint eliminating substantially all of the present tendency of these parts to rust from exposure.

It will be understood that the arm 11 is merely typical of a vehicle part to which the bolt or post 19 is secured and from which it rigidly projects.

I claim:

The combination with a rear view mirror as for a vehicle, said mirror including a housing having a spherically arcuate back; a rigid carrying member, a post secured to and extending from said member, ball and socket means coupling the back of said housing to the extending end of said post, a hollow resilient cup as of rubber, said cup having a heavy base portion, flattened to seat against said member and apertured to tightly embrace said post, said cup thinning gradually from said base to a flexible rim portion having a feather edge, and being interposed between said carrying member and said housing with the rim of said cup shiftably seated in contact with the back of said housing, said contact being spaced outwardly from said ball and socket means, said spacing being in excess of the diameter of said socket, whereby said mirror may be manually shifted into desired angular position with relation to said member and post, and twisted with relation to the rim portion of said cup to shift said mirror back with relation to said cup and adjust said back and said cup into related holding positions maintaining said angular position.

HARRY G. BROOKS.

REFERENCES CITED

The following references are of record in the file of this patent:

UNITED STATES PATENTS

| Number | Name | Date |
| --- | --- | --- |
| 1,558,641 | Short | Oct. 27, 1925 |
| 1,815,771 | Grant | July 21, 1931 |
| 1,895,560 | Weir | Jan. 31, 1933 |
| 2,083,718 | Kull et al. | June 15, 1937 |
| 2,338,780 | Poncher et al. | Jan. 11, 1944 |

FOREIGN PATENTS

| Number | Country | Date |
| --- | --- | --- |
| 134,709 | Great Britain | Nov. 13, 1919 |